US009406083B2

(12) United States Patent
Balakrishnan et al.

(10) Patent No.: US 9,406,083 B2
(45) Date of Patent: *Aug. 2, 2016

(54) RANKED NAVIGATION ELEMENT

(71) Applicant: Amazon Technologies, Inc., Seattle, WA (US)

(72) Inventors: Anoop Balakrishnan, Seattle, WA (US); Mark Chien, Bellevue, WA (US); Christopher Philip Jordan, Bellevue, WA (US); Jerome Paul, Seattle, WA (US); James Michael Healey, III, Seattle, WA (US); Chi Ming Kan, Seattle, WA (US); Catherine Lewis Beaudoin, Seattle, WA (US); Stacy Colasurdo, Kirkland, WA (US)

(73) Assignee: Amazon Technologies, LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/802,211

(22) Filed: Jul. 17, 2015

(65) Prior Publication Data
US 2015/0324888 A1 Nov. 12, 2015

Related U.S. Application Data

(63) Continuation of application No. 13/710,944, filed on Dec. 11, 2012, now Pat. No. 9,087,097.

(51) Int. Cl.
G06F 17/30 (2006.01)
G06Q 30/06 (2012.01)

(52) U.S. Cl.
CPC ........ *G06Q 30/0625* (2013.01); *G06F 17/3053* (2013.01); *G06F 17/30424* (2013.01); *G06F 17/30867* (2013.01)

(58) Field of Classification Search
CPC .......... G06F 17/3005; G06F 17/30112; G06F 17/30554; G06F 17/30696; G06F 17/30769; G06F 17/30837; G06F 17/30941; G06F 17/3091; G06Q 30/0643
USPC .................................................. 707/726, 731
See application file for complete search history.

(56) References Cited

U.S. PATENT DOCUMENTS

| 7,970,750 | B2 * | 6/2011 | Goel ................. | G06F 17/30864 707/706 |
| 8,301,514 | B1 * | 10/2012 | Vippagunta ........ | G06Q 30/0631 705/14.49 |
| 8,498,984 | B1 * | 7/2013 | Hwang ............. | G06F 17/30864 707/723 |
| 2005/0203918 | A1 * | 9/2005 | Holbrook .......... | G06F 17/30696 |
| 2009/0171813 | A1 * | 7/2009 | Byrne ............... | G06F 17/30867 705/26.1 |
| 2012/0078731 | A1 * | 3/2012 | Linevsky ........... | G06Q 30/0277 705/14.73 |
| 2013/0080422 | A1 * | 3/2013 | Pan ........................ | G06Q 30/00 707/722 |
| 2014/0089124 | A1 * | 3/2014 | Jha ....................... | G06F 17/3089 705/26.3 |

* cited by examiner

Primary Examiner — Mohammad S Rostami
Assistant Examiner — Robert F May
(74) Attorney, Agent, or Firm — Thomsa | Horstemeyer, LLP

(57) ABSTRACT

Disclosed are various embodiments for a navigation element generation application. A navigation element comprising a plurality of navigation aids is generated responsive to a search query and other data. A relevance score is calculated for the navigation element. The navigation element is inserted into a ranked list of search result items as a function of the relevance score and communicated to a client.

20 Claims, 6 Drawing Sheets

RANKED NAVIGATION ELEMENT

CROSS-REFERENCE TO RELATED APPLICATIONS

This application is a continuation of and claims priority to U.S. application Ser. No. 13/710,944 titled "RANKED NAVIGATION ELEMENT", filed Dec. 11, 2012, which is incorporated herein by reference in its entirety.

BACKGROUND

Navigation elements can be generated to link to relevant subsets of a category of items. The content and placement of the navigation elements should be dynamically generated to maximize relevance and client interaction.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Systems such as electronic commerce systems often maintain a searchable catalog of items. Search results generated by the electronic commerce system may contain a list of items ranked according to generated relevance scores. A navigation element can also be included amongst the list of items containing links to relevant subsets of the catalog. For example, a search query may be entered for "jeans." The list of items may contain those items responsive to the query "jeans," including clothing items. A navigation element may be inserted in a position within the ranked list containing navigation aids such as links to lists jeans belonging to particular brands, jeans of particular sizes, or other subsets of jeans.

The navigation aids which comprise the navigation element may be generated as a function of the search query. For example, the search query "jeans" may result in navigation aids linking to brands or sizes. As another example, the search query "tools" may result in navigation aids linking to manufacturers of tools or different types of tools. The navigation aids may also be generated as a function of browsing history with respect to previously generated navigation elements. For example, if previously generated navigation elements had low click or browsing rates, then new navigation aids may be included to maximize performance and relevance. Other factors may also be used to generate the navigation aids, such as domain knowledge of a customer, purchase history, or other factors.

After the navigation element has been generated, a relevance score can be calculated for the navigation element such that it can be ranked within the list of products responsive to the search query. Inclusion of the navigation element within network pages embodying the ranked list may be responsive to a ranking of the navigation element exceeding a threshold, or as a function of other data.

In the following discussion, a general description of the system and its components is provided, followed by a discussion of the operation of the same.

Figure 1:
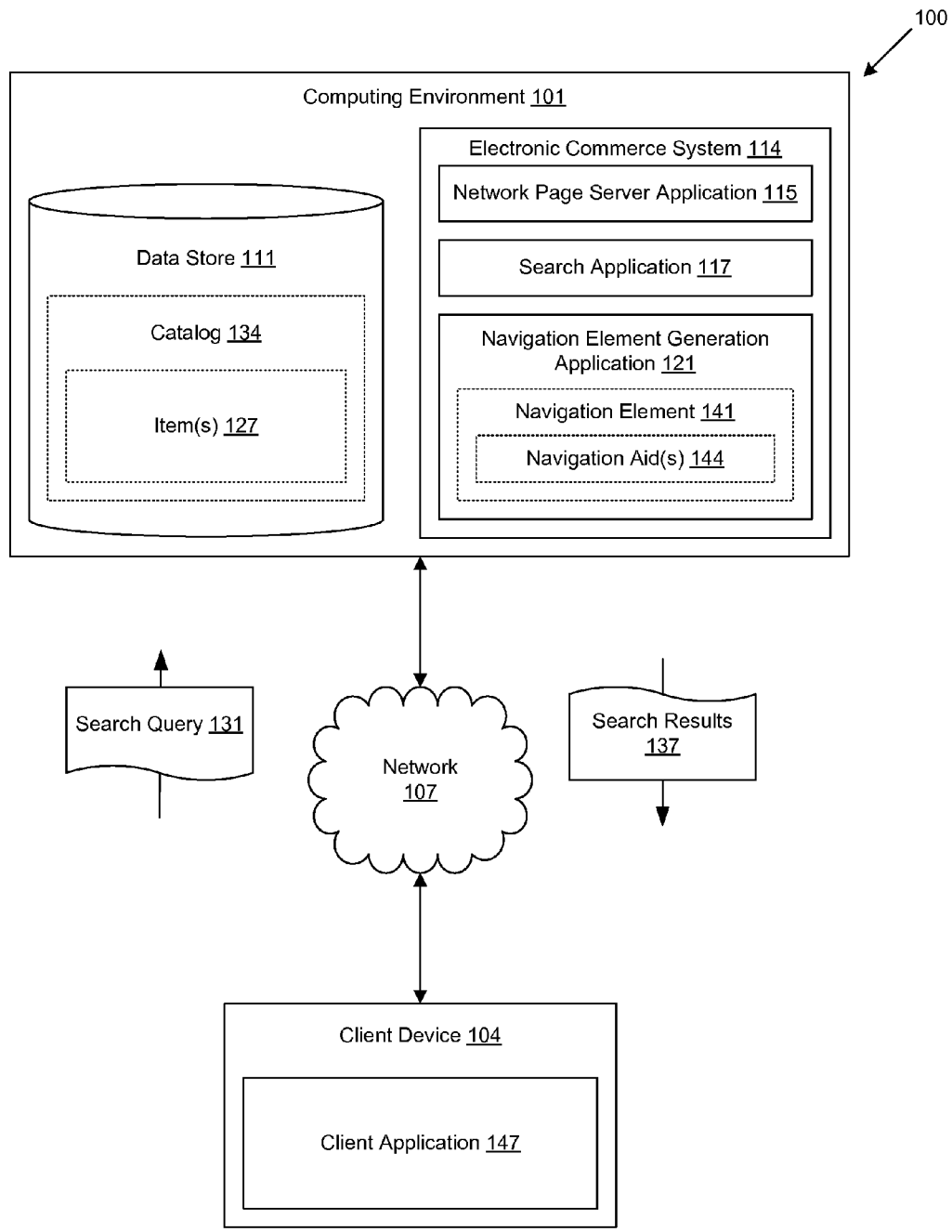
FIG. 1 is a drawing of a networked environment according to various embodiments of the present disclosure.

With reference to FIG. 1, shown is a networked environment 100 according to various embodiments. The networked environment 100 includes a computing environment 101, a client 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include an electronic commerce system 114 having a network page server application 115, a search application 117, and a navigation element generation application 121, and other applications, services, processes, systems, engines, or functionality not discussed in detail herein.

The electronic commerce system 114 is executed in order to facilitate the online purchase of items 127 over the network 107. The electronic commerce system 114 also performs various backend functions associated with the online presence of a merchant in order to facilitate the online purchase of items 127 as will be described. For example, the electronic commerce system 114 generates network pages such as web pages or other types of network content that are provided to clients 104 for the purposes of selecting items for purchase, rental, download, lease, or other form of consumption as will be described. Such network pages are communicated to the client 104 by the network page server application 115.

The search application 117 facilitates the application of search queries 131 communicated by a client 104 to a catalog 134 of items 127 to generate search results 137 comprising those items 127 responsive to the search query 131. The navigation element generation application 121 generates a navigation element 141 comprising a plurality of navigation aids 144 for insertion into network pages comprising embodying search results 137. The navigation aids 144 comprise links such as hyperlinks to subsets of the catalog 134 relevant to the search query 131 and generated as a function of the search query 131 and other data. The subsets of the catalog 134 may be generated as those items 127 satisfying one or more predefined rules defined with respect to a navigation aid 144 or satisfying one or more dynamically calculated rules defined with respect to the navigation aid 144.

In some embodiments, the catalog 134 may organize the items 127 into a taxonomy model. In such an embodiment, the subsets of the catalog 134 may be generated as a function of elements of the taxonomy of items 127. The subsets of the catalog 134 may also be generated by another approach.

The navigation element 141 may be generated as a function of a search query 131. For example, a search query 131 for "jeans" may generate a navigation element comprising navigation aids 144 each corresponding to brands of jeans, sizes or jeans, price ranges of jeans, or other subsets of jeans. A browsing event such as a click would navigate the client 104 to a subset of the catalog 134 embodying those jeans items 127 belonging to the corresponding brand, size, or other subset. As another example, a search query 131 for "tools" may generate a navigation element 141 comprising navigation aids 144 each corresponding to manufacturers of tools, types of tools such as hammers or wrenches, quality of tools, or other subsets of tools.

As another example, a search query 131 may comprise one or more search terms which correspond to an element in a taxonomy of items 127. In such an embodiment, the search query 131 may generate a navigation element 141 comprising navigation aids 144 each corresponding to a subelement of the taxonomy element embodied in the search term. For example, a taxonomy element may correspond to a particular brand of tools, "CheapCo Tools." The taxonomy element may be linked to subelements "CheapCo Hammers", "CheapCo Screwdrivers", and "CheapCo Plows." In such an embodiment, a search query 131 for "CheapCo tools and accessories" may generate a navigation element 141 comprising navigation aids 144 corresponding to the different subelements of the "CheapCo Tools" taxonomy element. Other approaches may also be used to generate the navigation element 141 as a function of the search query 131.

The navigation element 141 may also be generated as a function of browsing activity with respect to previously generated navigation elements 141. The browsing activity may correspond to the client 104 or other customers of the electronic commerce system 114. For example, a previously generated navigation element 141 associated with the search query 131 "tools" may have resulted in low click or browsing rates with respect to the component navigation aids 144. A subsequently generated navigation element 141 may comprise different component navigation aids 144 or a different ordering of the navigation aids 144 to entice a greater click rate. As another example, a previously generated navigation element 141 associated with the search query 131 "jeans" may have resulted in a high click rate, and the subsequently generated navigation element 141 may be similar or a duplicate of the previously generated navigation element 141 to ensure a high click rate. Browsing activity with respect to previously generated navigation elements 141 may be used in another approach to generate a navigation element 141.

Past purchases through the electronic commerce system 114 may also be used to generate the navigation element 141. The past purchases may be with respect to the client 104. For example, if the client 104 is associated with many past purchases of tools from a particular manufacturer, a search query 131 "tools" may generate a navigation element 141 comprising a navigation aid 144 corresponding to that particular manufacturer. As another example, a client 104 may have past purchases of clothing belonging to a particular size. The navigation element 141 may comprise navigation aids 144 linking to subsets of the catalog 134 having that previously purchased size. As another example, a client 104 may be associated with past purchases of clothing from higher-end brands. The navigation element 141 may comprise navigation elements 144 corresponding to those or other high-end clothing brands. Past purchases with respect to the client 104 may also be used by another approach.

The past purchases may also be with respect to the entirety of a subset of customers of the electronic commerce system 114. For example, if particular brands of jeans have a high purchase rate across all customers, indicating popularity, then the navigation element 141 may comprise navigation aids 144 corresponding to those popular brands. Past purchases may be used by another approach to generate the navigation element 121.

The navigation element 141 may also be generated as a function of a purchased insertion of a navigation aid 144 into the navigation element 141. For example, a manufacturer or brand may purchase the rights to having a navigation aid 144 inserted into navigation elements 141 generated in response to one or more search queries 131, or generated by another approach.

Domain knowledge with respect to the client 104 may also be used to generate the navigation element 141. Domain knowledge comprises knowledge about the environment in which the client 104 operates. Domain knowledge may comprise temporal or location data associated with operation of the client 104, attributes or characteristics of customers or users associated with the client 104, or other data. For example, past purchases, known customer data, or other data may indicate that the client 104 is associated with a male customer. In such embodiments, the navigation element 141 may comprise navigation aids 144 linking to brands associated with predominantly male clothing, or to a specifically designated subset of the catalog 134 corresponding to male clothing. As another example, the client 104 may be associated with a plurality of customers comprising various age and gender combinations. In such an embodiment, the navigation element 141 may comprise subsets of the catalog 134 marketed towards one or more of the age and gender combinations.

In another embodiment, domain knowledge relating to future events may be used independently or in conjunction with other data to generate the navigation element 141. For example, a search query 131 for "jackets" may generate a navigation element 141 comprising navigation aids 144 linking to manufacturers of light jackets if the search query 131 is communicated during or near the fall season, and linking to heavy jackets or parkas during or near winter. As another example, a client 104 may be known to be associated with a customer having an adolescent daughter. A search query 131 for "dresses" may generate a navigation element 141 comprising a navigation aid 144 linking to a subset of the catalog for prom dresses if the search query 131 is communicated in the spring. Future events may be used to generate the navigation element 141 by another approach.

In some embodiments, the navigation element generation application 121 may determine that a plurality of navigation aids 144 may be relevant to a navigation element 141, and the number of relevant navigation aids 144 exceeds the number of maximum navigation aids 144 which can be inserted into a navigation element 141. In such an embodiment, the navigation element generation application 121 may calculate confidence scores each corresponding to one of the plurality of navigation aids 144 and then select those navigation aids 144 having the highest confidence scores for inclusion into the navigation element 141.

Confidence scores may be generated as a function of domain knowledge with respect to the client 104. For example, a navigation aid 144 linking to plus-sized clothing may have a higher confidence score for clients 104 known to be associated with a single customer known to wear plus-sized clothing, but have a lower confidence score for a client 104 associated with a plurality of customers of unknown or varying clothing size. Confidence scores may be generated as a function of past purchases, browsing activity, or other data. As another example, a navigation aid 144 for higher-quality expensive tools may have a higher confidence score for a client 104 having only purchased expensive tools, but have a lower confidence score for clients 104 having purchased tools from a variety of price ranges. Confidence scores may also be generated for navigation aids 144 by another approach.

After the navigation element 141 has been generated, a relevance score is calculated for the navigation element 141 for comparison to the relevance scores of the items 127 in the search results 137. The relevance score of the navigation element 141 may be calculated as a function of data used to generate the navigation element 141 or the component navigation aids 144 such as browsing activity, past purchases, or other data. Additionally, the relevance scores of previously generated navigation elements 141 may also be used to generate the navigation element 141. For example, a generated navigation element 141 may be distinct from a previously generated navigation element 141 having a low relevance score as an attempt to increase the relevance score. The relevance score may be calculated by the navigation element generation application 121, the search application 117, or other functionality of the electronic commerce system 114.

Additionally, after the navigation element 141 has been generated, the navigation element 141 is inserted into the search results 137 as being ranked as a function of the relevance scores of the navigation element 141 and the responsive items 127. The insertion may be performed by the navigation element generation application 121, the search application 117, or other functionality of the electronic commerce system 114.

The data stored in the data store 111 includes, for example, a catalog 134 comprising items 127, and potentially other data. The catalog 134 comprises a searchable organization of items 127. The catalog 134 may comprise indices, groupings if items 127 into categories, logical relations of items 127 or groups of items 127 as a function of a taxonomy, or other data. Items 127 correspond to data representative of products available for sale or rental through the electronic commerce system 114. Items 127 may correspond to physical goods, services, digital content, or other products.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 147 and/or other applications. The client application 147 may be executed in a client 104, for example, to access network content served up by the computing environment 101 and/or other servers. To this end, the client application 147 may comprise, for example, a browser, a dedicated application, etc. The client 104 may be configured to execute applications beyond the client application 147 such as, for example, email applications, social networking applications, word processors, spreadsheets, and/or other applications.

Next, a general description of the operation of the various components of the networked environment 100 is provided. To begin, the client 104 communicates a search query 131 to the electronic commerce system 114 via the network 107. Communicating the search query 131 may be facilitated by a client application 147 or other functionality executed on the client 104. The search application 117 generates a pool of items 127 from the catalog 134 that are responsive to the search query 131. Next, the navigation element generation application 121 generates a navigation element 141 comprising a plurality of navigation elements 144. The navigation element generation application 121 generates the navigation element 141 as a function of at least the search query 131. The navigation element generation application 121 may also generate the navigation element 141 as a function of past purchases, browsing activity with respect to previously generated navigation elements 141, domain knowledge, relevance scores of previously generated navigation elements 141, and potentially other data.

Generating the navigation element 141 may comprise generating a plurality of navigation aids 144 for possible inclusion in the navigation element 141, and then including a subset of the plurality of the navigation aids 144. In such an embodiment, the navigation element generation application 121 may generate confidence values for each of the navigation aids 144 and include those navigation aids 144 having the highest confidence values. The confidence values may be generated as a function of domain knowledge with respect to the client 104, past purchases, browsing activity, or other data.

Next, the navigation element generation application 121 calculates a relevance score for the generated navigation element 141. The relevance score for the navigation element 141 may be generated as a function of data from which the navigation element 141 was generated including past purchases, browsing activity, domain knowledge, previously calculated relevance scores, or other data. The relevance score for the navigation element 141 may be calculated from data distinct from data from which the navigation element 141 was generated.

After a relevance score has been calculated for the navigation element 141, the navigation element 141 is ranked amongst the pool of items 127 of the search results 137 as a function of the relevance score of the navigation element 141 and the relevance scores of the items 127. Next, the ranked list of the search results 137 including the pool of items 127 and the navigation element 141 are encoded as a network page by the network page server application 115 and communicated to the client 104 via the network 107. The network page is then rendered by a client application 147 or other functionality executed on the client 104.

Figure 2:
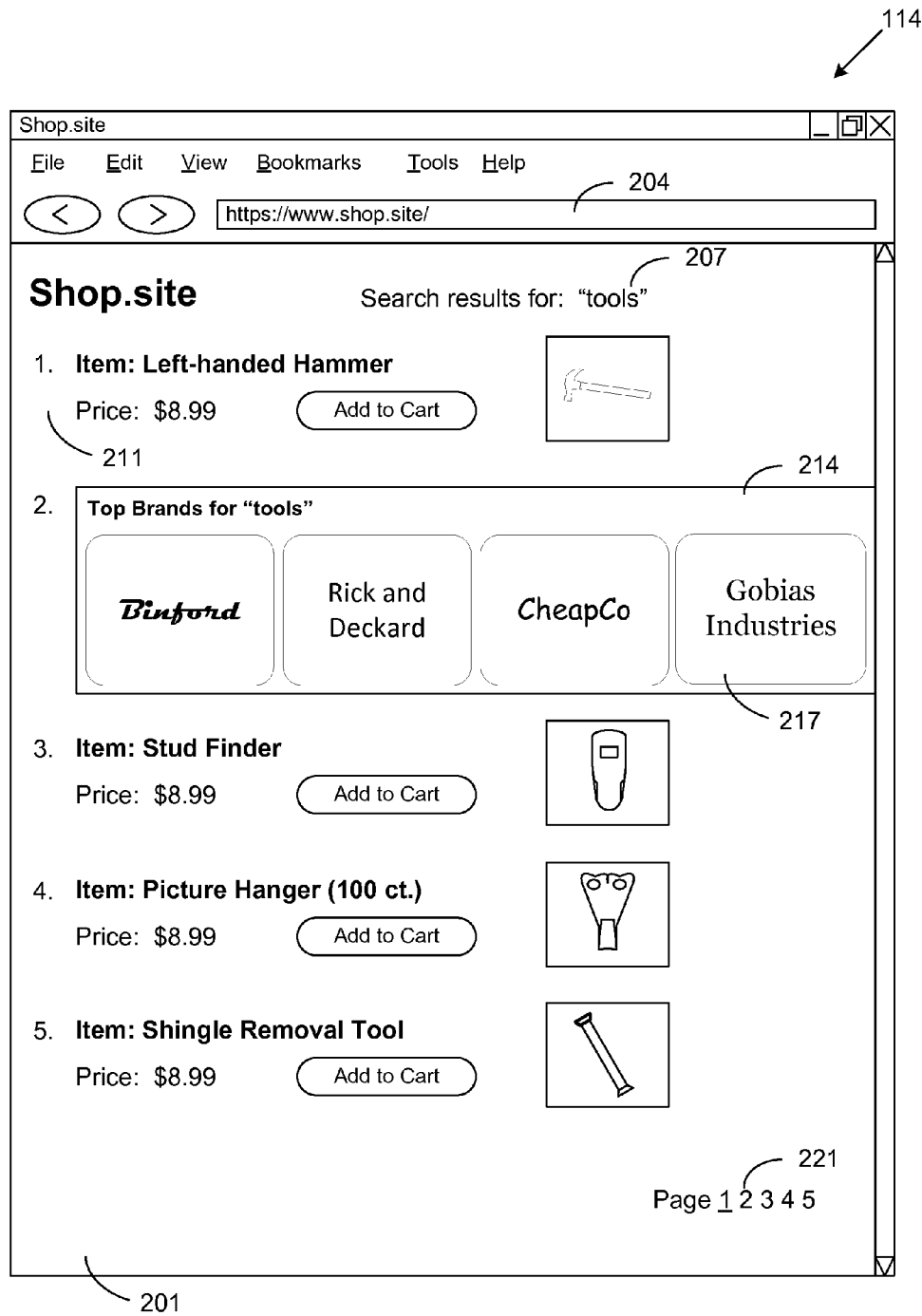
FIG. 2 is a drawing of an example of a user interface rendered by a client in the networked environment of FIG. 1 according to various embodiments of the present disclosure.

In some embodiments the navigation element 141 is excluded from the search results 137 responsive to a ranking of the navigation element 141 falling below a threshold. In other embodiments in which the search results 137 are encoded into multiple sequential network pages, the navigation element 141 is excluded from the search results 137 responsive to a page number of a network page comprising the navigation element 141 exceeding a threshold. The threshold may be predefined or determined Referring next to FIG. 2, shown is a user interface 201 generated by the electronic commerce system 114 (FIG. 1) embodying a navigation element 141 (FIG. 1) generated by the navigation element generation application 121 (FIG. 1) according to an embodiment of the present disclosure. The user interface 201 may comprise a network page generated by a network page server application 115 (FIG. 1) and rendered by a browser client application 147 (FIG. 1). In the alternative, the user interface 201 may comprise data encoded for rendering by a dedicated client application 147.

Item 204 is a uniform resource locator (URL) input to facilitate communication between the client 104 and the electronic commerce system 114. Item 207 is a text string embodying a previously communicated search query 131 (FIG. 1). Item 211 is a list of items 127 (FIG. 1) from a catalog 134 (FIG. 1) responsive to the previously communicated search query 131. Item 214 is a navigation element 141 ranked amongst the list of items 127 according to relevance scores. Item 217 is one of a plurality of navigation aids 144 (FIG. 1) of the navigation element 141 corresponding to a manufacturer of tools. Item 221 is a group of hyperlinks for navigation amongst a plurality of network pages embodying the search results 137.

Figure 3:
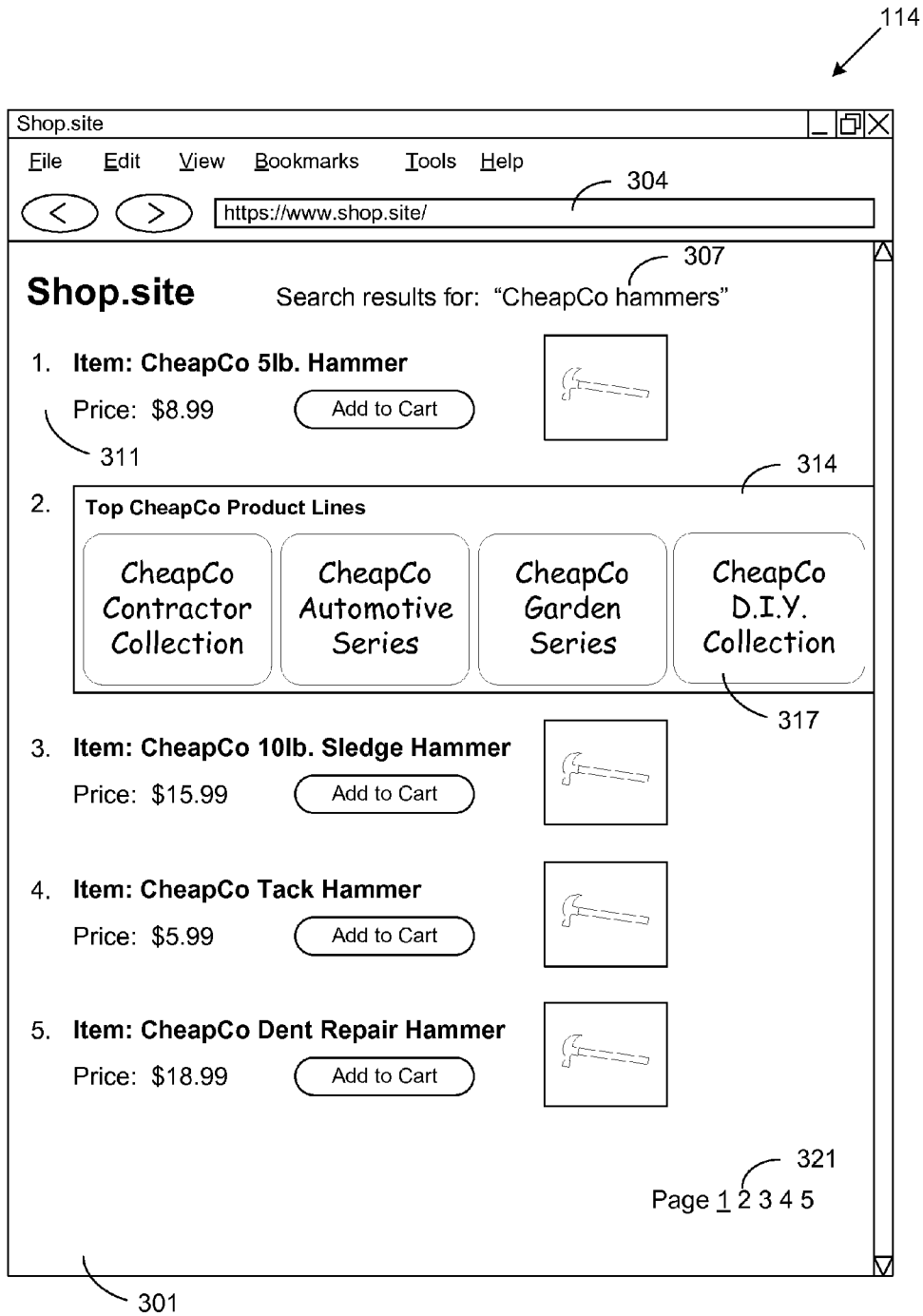
FIG. 3 is a drawing of an example of a user interface rendered by a client in the networked environment of FIG. 1 according to various embodiments of the present disclosure.

Moving on to FIG. 3, shown is a user interface 301 generated by the electronic commerce system 114 (FIG. 1) embodying a navigation element 141 (FIG. 1) generated by the navigation element generation application 121 (FIG. 1) according to an embodiment of the present disclosure. The user interface 301 may comprise a network page generated by a network page server application 115 (FIG. 1) and rendered by a browser client application 147 (FIG. 1) as a function of a taxonomy of the catalog 134 (FIG. 1). In the alternative, the user interface 301 may comprise data encoded for rendering by a dedicated client application 147.

Item 304 is a uniform resource locator (URL) input to facilitate communication between the client 104 and the electronic commerce system 114. Item 307 is a text string embodying a previously communicated search query 131 (FIG. 1) for "CheapCo hammers". In the present embodiment, the search term "CheapCo" corresponds to a taxonomy element comprising the "CheapCo" brand of tools. Item 311 is a list of items 127 (FIG. 1) from the catalog 134 responsive to the previously communicated search query. In the present example, item 311 corresponds to a list of CheapCo hammers.

Item 314 is a navigation element 141 ranked amongst the list of items 127 according to relevance scores. Item 317 is one of a plurality of navigation aids 144 (FIG. 1) of the navigation element 141. Each of the navigation aids 144 of item 317 are representative of a taxonomy subelement related to the "CheapCo" taxonomy element corresponding to the "CheapCo" search term. In this example, the taxonomy subelements are representative of product lines or product series under the "CheapCo" manufacturer brand. Item 321 is a group of hyperlinks for navigation amongst a plurality of network pages embodying the search results 137.

Figure 4:
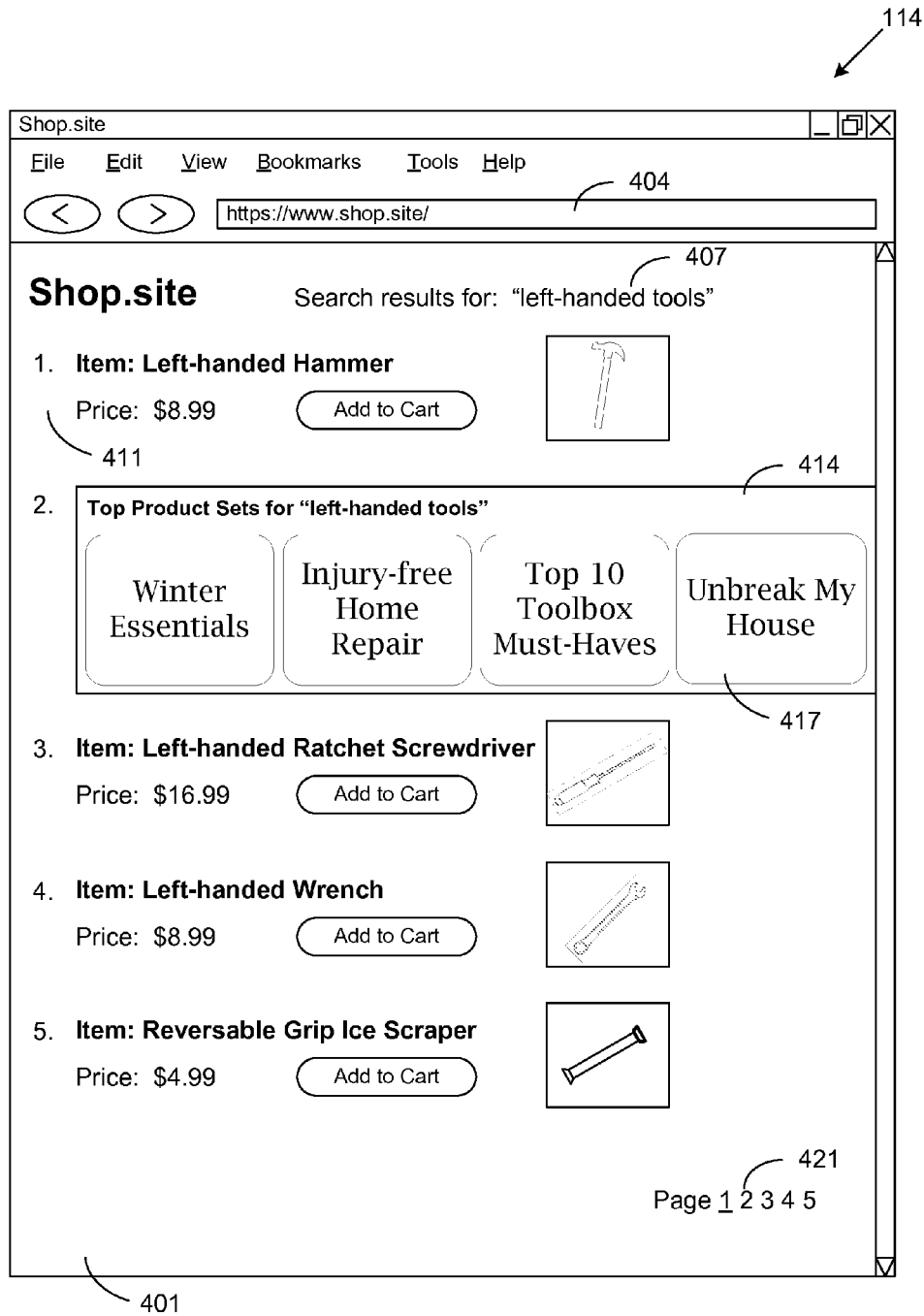
FIG. 4 is a drawing of an example of a user interface rendered by a client in the networked environment of FIG. 1 according to various embodiments of the present disclosure.

Turning next to FIG. 4, shown is a user interface 401 generated by the electronic commerce system 114 (FIG. 1) embodying a navigation element 141 (FIG. 1) generated by the navigation element generation application 121 (FIG. 1) according to an embodiment of the present disclosure. The user interface 401 may comprise a network page generated by a network page server application 115 (FIG. 1) and rendered by a browser client application 147 (FIG. 1). In the alternative, the user interface 401 may comprise data encoded for rendering by a dedicated client application 147.

Item 401 is a uniform resource locator (URL) input to facilitate communication between the client 104 and the electronic commerce system 114. Item 407 is a text string embodying a previously communicated search query 131 (FIG. 1). Item 411 is a list of items 127 (FIG. 1) from a catalog 134 (FIG. 1) responsive to the previously communicated search query 131. Item 414 is a navigation element 141 ranked amongst the list of items 127 according to relevance scores. Item 417 is one of a plurality of navigation aids 144 (FIG. 1) of the navigation element 141. Each of the navigation aids 144 is representative of a curated subset of the catalog 134 relevant to the search query 131.

Additionally, domain knowledge associated with the client 104 may be used to generate the navigation aids 144. For example, the "Winter Essentials" navigation aid 144 may be generated as a function of domain knowledge indicating that a customer associated with the client 104 lives in a snowy geographical area or in that the client 104 submitted the search query 131 during or near winter. As another example, the "Unbreak My House" may correspond to a curated subset of tools specializing in home repairs. In such an example, the navigation aid 144 may be generated as a function of domain knowledge indicating that a customer associated with the client 104 owns or lives in a house. Item 421 is a group of hyperlinks for navigation amongst a plurality of network pages embodying the search results 137.

Figure 5:
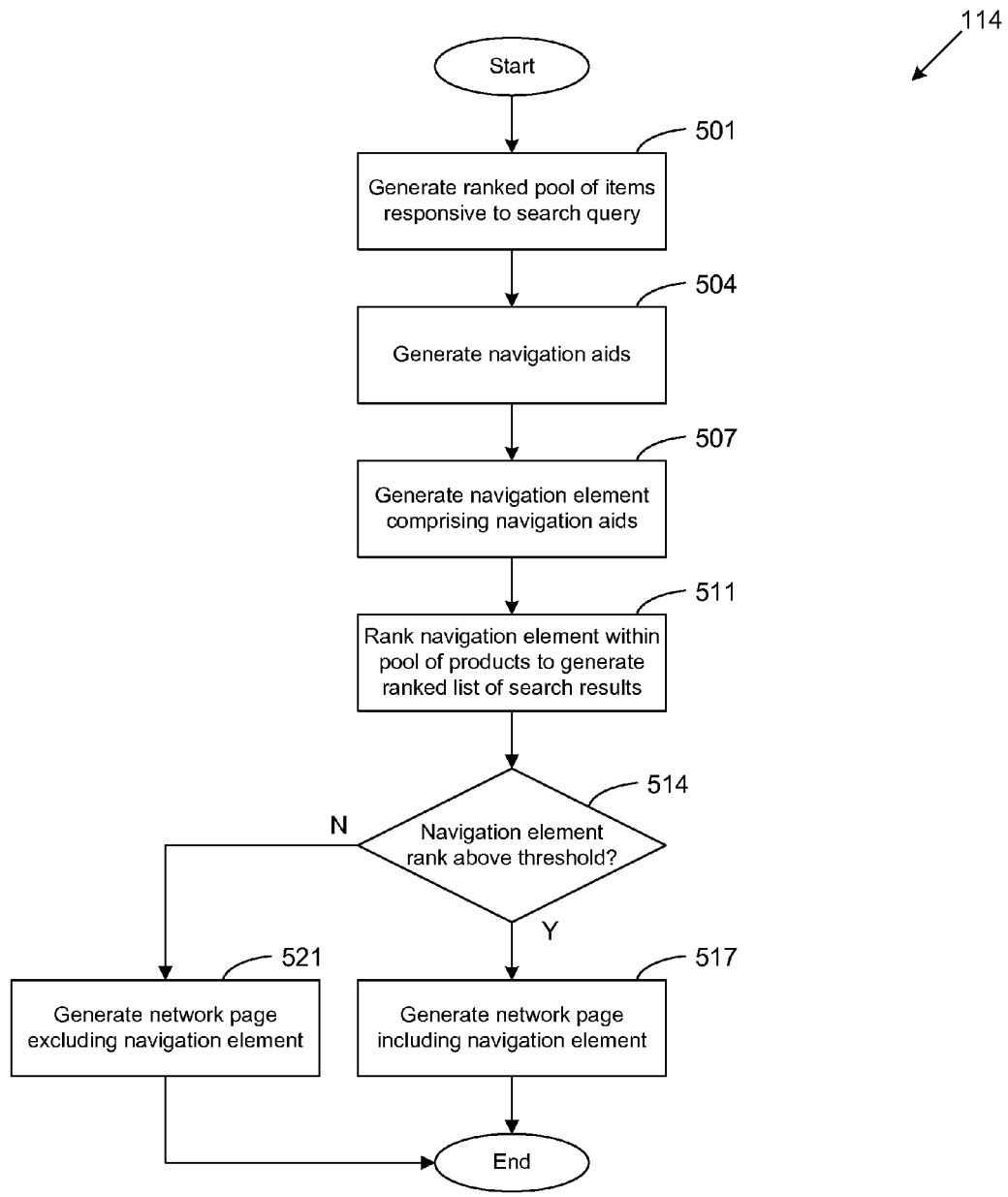
FIG. 5 is a flowchart illustrating one example of functionality implemented as portions of a navigation element generation application executed in a computing environment in the networked environment of FIG. 1 according to various embodiments of the present disclosure.

Referring next to FIG. 5, shown is a flowchart that provides one example of the operation of a portion of the navigation element generation application 121 (FIG. 1) implemented in the electronic commerce system 114 (FIG. 1) according to various embodiments. It is understood that the flowchart of FIG. 5 provides merely an example of the many different types of functional arrangements that may be employed to implement the operation of the portion of the electronic commerce system 114 as described herein. As an alternative, the flowchart of FIG. 5 may be viewed as depicting an example of steps of a method implemented in the computing environment 101 (FIG. 1) according to one or more embodiments.

Beginning with box 501 the search application 117 (FIG. 1) of the electronic commerce system 114 generates a ranked pool of items 127 (FIG. 1) from a catalog 134 (FIG. 1) responsive to a search query 131 (FIG. 1). The search query 131 may be obtained from a client 104 via the network 107, or by another approach. The items 127 are ranked according to relevance scores calculated by the search application 117 corresponding to each of the items 127.

Next, in box 504, the navigation element generation application 121 generates navigation aids 144 (FIG. 1) as a function of at least the search query 137. For example, navigation aids 144 corresponding to brands or sizes of jeans may be generated for a search query 131 "jeans." The navigation aids 144 may also be generated with respect to past purchases consummated by customers of the electronic commerce system 114. For example, a search query 131 "tools" may generate navigation aids 144 corresponding to the most frequently purchased or least returned brands of tools. The navigation aids 144 may also be generated as a function of browsing activity with respect to previously generated navigation elements 141. For example, the generated navigation aids 144 may comprise those navigation aids 144 which resulted in the most clicks when presented with respect to the search query 131. Navigation aids 144 may also be generated by another approach.

In some embodiments, generating navigation aids 144 further comprises calculating confidence scores corresponding to each of the navigation aids 144. Confidence scores may be calculated as a function of domain knowledge with respect to the client 104, as a function of data used to generate the navigation aids 144, or other data.

Next, in box 507 the navigation element generation application 121 generates a navigation element 141 comprising the generated navigation aids 144. In some embodiments this comprises generating a navigation element 141 comprising the entirety of the generated navigation aids 144. In other embodiments, this may comprise generating a navigation element 141 comprising a subset of the generated navigation aids 144. The subset of navigation aids 144 may be determined as a function of the confidence scores associated with the navigation aids, or by another approach. Additionally, the ordering of the navigation aids 144 may be determined as a function of browsing activity with respect to previously generated navigation elements 141 or other data.

In box 511 the navigation element 141 is ranked within the ranked pool of items 127 generated responsive to the search query 137. This may comprise calculating a relevance score for the navigation element 141 and ranking the navigation element 141 with respect to the relevance scores of the items 127. Ranking the navigation element 141 may within the items 127 also be performed by another approach. Ranking the navigation element 141 within the list of items 127 generates search results 137 (FIG. 1).

In box 514, the navigation element generation application 121 determines if the rank of the navigation element 141 is above a threshold. This may comprise determining if a numerical rank of the navigation element 141 with respect to the other items is above a threshold. This may also comprise determining if the navigation element 141, when the search results 137 are encoded into multiple network pages, appears on a network page having a page number above a threshold.

If the navigation element 141 is ranked above the threshold then the network page server application 115 (FIG. 1) generates a network page embodying the search results 137 which include the navigation element 141 in box 517. Otherwise, in box 521, the network page server application 115 generates a network page embodying the search results 137 excluding the navigation element 141.

Figure 6:
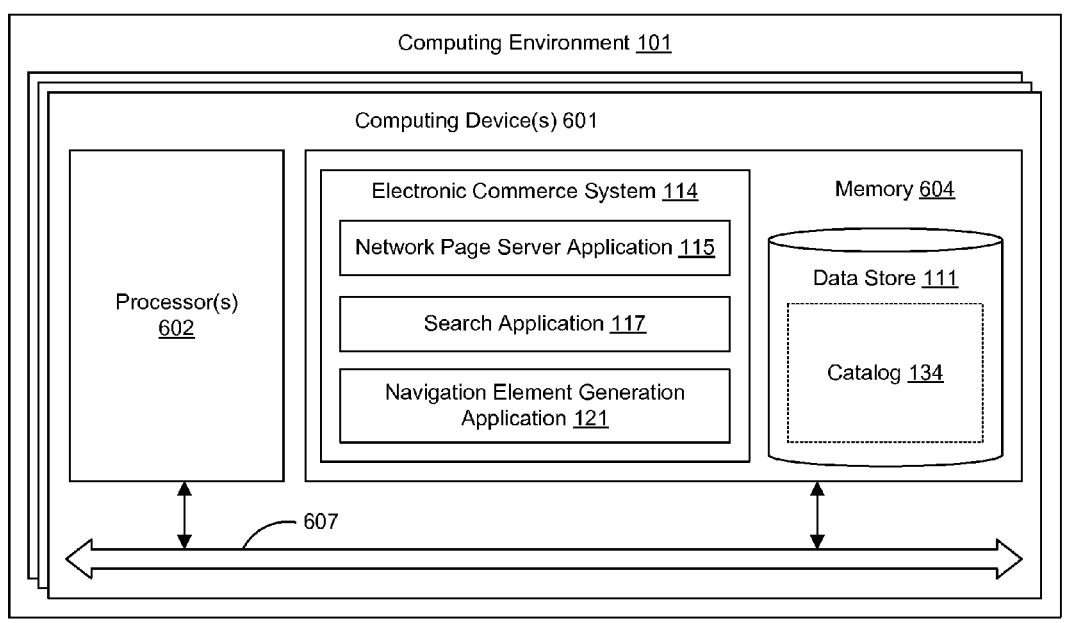
FIG. 6 is a schematic block diagram that provides one example illustration of a computing environment employed in the networked environment of FIG. 1 according to various embodiments of the present disclosure.

With reference to FIG. 6, shown is a schematic block diagram of the computing environment 103 according to an embodiment of the present disclosure. The computing environment 103 includes one or more computing devices 601. Each computing device 601 includes at least one processor circuit, for example, having a processor 602 and a memory 604, both of which are coupled to a local interface 607. To this end, each computing device 601 may comprise, for example, at least one server computer or like device. The local interface 607 may comprise, for example, a data bus with an accompanying address/control bus or other bus structure as can be appreciated.

Stored in the memory 604 are both data and several components that are executable by the processor 602. In particular, stored in the memory 604 and executable by the processor 602 are an electronic commerce system 114 (FIG. 1) having a network page server application 115 (FIG. 1), a search application 117 (FIG. 1), and a navigation element generation application 121 (FIG. 1), and potentially other applications. Also stored in the memory 604 may be a data store 111 (FIG. 1) storing a catalog 134 (FIG. 1) and other data. In addition, an operating system may be stored in the memory 604 and executable by the processor 602.

It is understood that there may be other applications that are stored in the memory 604 and are executable by the processor 602 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 604 and are executable by the processor 602. In this respect, the term "executable" means a program file that is in a form that can ultimately be run by the processor 602. Examples of executable programs may be, for example, a compiled program that can be translated into machine code in a format that can be loaded into a random access portion of the memory 604 and run by the processor 602, source code that may be expressed in proper format such as object code that is capable of being loaded into a random access portion of the memory 604 and executed by the processor 602, or source code that may be interpreted by another executable program to generate instructions in a random access portion of the memory 604 to be executed by the processor 602, etc. An executable program may be stored in any portion or component of the memory 604 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 604 is defined herein as including both volatile and nonvolatile memory and data storage components. Volatile components are those that do not retain data values upon loss of power. Nonvolatile components are those that retain data upon a loss of power. Thus, the memory 604 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 602 may represent multiple processors 602 and/or multiple processor cores and the memory 604 may represent multiple memories 604 that operate in parallel processing circuits, respectively. In such a case, the local interface 607 may be an appropriate network that facilitates communication between any two of the multiple processors 602, between any processor 602 and any of the memories 604, or between any two of the memories 604, etc. The local interface 607 may comprise additional systems designed to coordinate this communication, including, for example, performing load balancing. The processor 602 may be of electrical or of some other available construction.

Although the navigation element generation application 121 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 5 shows the functionality and operation of an implementation of portions of the navigation element generation application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 602 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the navigation page server application 115, that comprises software or code can be embodied in any non-transitory computer-readable medium for use by or in connection with an instruction execution system such as, for example, a processor 602 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed by the at least one computing device, causing the at least one computing device to at least:
select a plurality of search results responsive to a search query comprising at least one search term obtained from a client, the search results being selected from a taxonomy comprising a plurality of taxonomy elements and the search term corresponds to at least one of the taxonomy elements;
calculate a plurality of confidence scores as a function of domain knowledge associated with the client, individual ones of the confidence scores corresponding to one of a plurality of navigational aids, wherein individual ones of the plurality of navigation aids comprise a link corresponding to a respective subset of the taxonomy elements corresponding to the search term;
generate a navigation element comprising the plurality of navigation aids as a function of the search query, and the plurality of confidence scores;
generate a plurality of relevance scores, at least one of the relevance scores corresponding to the navigation element, and individual ones of the remainder of the relevance scores corresponding to a corresponding one of the plurality of search results;
generate, as a function of the plurality of relevance scores, a ranked list comprising the plurality of search results and the navigation element; and
communicate at least a subset of the ranked list to the client.

2. The non-transitory computer-readable medium of claim 1, wherein the program further causes the at least one computing device to exclude the navigation element from the ranked list responsive to a placement of the navigation element within the ranked list falling below a threshold.

3. The non-transitory computer-readable medium of claim 1, wherein the navigation element is further generated as a function of browsing behavior with respect to a previously generated navigation element.

4. A system, comprising:
at least one computing device comprising at least one processor and memory storing instructions that, when executed by the at least one processor, cause the at least one computing device to at least:
select a plurality of search results responsive to a search query obtained from a client;
generate a navigation element comprising a plurality of navigation aids as a function of the search query, individual ones of the plurality of navigation aids comprising a link corresponding to a respective subset of taxonomy elements corresponding to the search query;

generate a plurality of relevance scores, one of the relevance scores corresponding to the navigation element, and a remainder of the relevance scores corresponding to the plurality of search results;

generate, as a function of the relevance scores, a ranked list comprising the plurality of search results and the navigation element;

communicate at least a subset of the ranked list to the client.

5. The system of claim 4, wherein the instructions further cause the at least one computing device to exclude the navigation element from the subset of the ranked list responsive to a placement of the navigation element in the ranked list falling below a threshold.

6. The system of claim 4, wherein the taxonomy elements are included in a catalog of an electronic commerce system.

7. The system of claim 4, wherein the navigation element is further generated as a function of a customer behavior associated with the electronic commerce system.

8. The system of claim 7, wherein the customer behavior comprises an interaction history for a plurality of customers with respect to the electronic commerce system.

9. The system of claim 8, wherein the interaction history comprises a purchase history.

10. The system of claim 4, wherein the navigation aids are a subset of potential navigation aids, the potential navigation aids being associated with one of a plurality of confidence scores, and the wherein the instructions further cause the at least one computing device to select the subset of potential navigation aids as a function of the confidence scores.

11. The system of claim 4, wherein the navigation element is generated based at least in part on browsing activity with respect to a previously generated navigation element.

12. The system of claim 4, wherein the navigation element is further generated as a function of domain knowledge with respect to the client.

13. The system of claim 4, wherein the navigation aids further comprise at least one predefined rule, and wherein respective subset of taxonomy elements is responsive to the at least one predefined rule.

14. A method, comprising:

obtaining, by a computing device, a search query from a client;

generating, by the computing device, a plurality of search results responsive to the search query, individual ones of the plurality of search results corresponding to a respective one of a plurality of relevance scores, the plurality of search results being ranked as a function of the relevance scores;

generating, by the computing device, a navigation element as a function of the search query, the navigation element comprising a plurality of navigation links, individual ones of the plurality of navigation links corresponding to a respective subset of a plurality of taxonomy elements corresponding to the search query;

ranking, by the computing device, the navigation element within the plurality of search results as a function of another relevance score for the navigation element;

communicating, by the computing device, to the client, at least a subset of the plurality of search results and the navigation element as a ranked list, the ranked list being generated as a function of the relevance scores and the other relevance score of the navigation element.

15. The method of claim 14, wherein the taxonomy elements are included an a catalog of an electronic commerce system, and the plurality of search results comprise a plurality of items of the catalog.

16. The method of claim 14, wherein the navigation element is further generated as a function of a purchased placement of one of the navigation links in the navigation element.

17. The method of claim 14, wherein the navigation element is further generated as a function of a domain knowledge associated with the client.

18. The computer-implemented method of claim 17, wherein the domain knowledge comprises at least one of a calendar season, a gender, or a family composition of a user associated with the client.

19. The method of claim 17, wherein individual ones of the navigation links correspond to a plurality of confidence scores generated as a function of at least the domain knowledge, and the navigation element is generated as a function of the plurality of confidence scores.

20. The method of claim 19, wherein the navigation links are a subset of potential navigation links, the navigation links being selected from the potential navigation links for inclusion in the navigation element according to the plurality of confidence scores.

* * * * *